United States Patent [19]

Nakasuna et al.

[11] Patent Number: 4,894,731
[45] Date of Patent: Jan. 16, 1990

[54] METHOD OF SHOOTING BY CAMERA INTEGRATED WITH VTR

[75] Inventors: Seiko Nakasuna, Katsuta; Takeshi Kawarai; Shuji Toyoshima, both of Ibaraki; Hirotaka Kobayashi, Katsuta; Takanori Nishiyama, Koganei, all of Japan

[73] Assignee: Hitachi, Ltd., Tokyo, Japan

[21] Appl. No.: 151,965

[22] Filed: Feb. 3, 1988

[30] Foreign Application Priority Data

Feb. 6, 1987 [JP] Japan ................................. 62-24511

[51] Int. Cl.⁴ ............................................. H04N 5/782
[52] U.S. Cl. ...................................... 360/9.1; 358/906
[58] Field of Search .................... 360/10.1, 10.3, 11.1, 360/9.1, 35.1, 69; 358/312, 313, 108, 906, 909, 310, 335

[56] References Cited

U.S. PATENT DOCUMENTS

| 4,001,881 | 1/1977 | Folsom | 360/35.1 |
| 4,007,490 | 2/1977 | Shoda | 360/35.1 |
| 4,238,776 | 12/1980 | Tanaka | 360/35.1 |
| 4,544,959 | 10/1985 | Kozuki et al. | 360/33.1 |
| 4,562,493 | 12/1985 | Nishitani et al. | 360/9.1 |
| 4,633,335 | 12/1986 | Yamamoto et al. | 360/9.1 |
| 4,658,319 | 4/1987 | Tripp et al. | 360/11.1 |

OTHER PUBLICATIONS

"Shashin Kogyo", Nov. 1986, pp. 73-80, (No Translation).

Primary Examiner—Donald McElheny, Jr.
Attorney, Agent, or Firm—Antonelli, Terry & Wands

[57] ABSTRACT

In a camera integrated with a VTR, a hotographing method by use of a self timer is disclosed. This method comprises the steps of: setting a recording standby state; supplying to a display section a repetitive signal for allowing the display section to be alternately repetitively lit on and off by operating a self timer operating element; supplying a light-on signal to the display section when a predetermined time has passed to thereby light on the display section, supplying an operation signal to the VTR section, cancelling the camera recording standby state, and thereby starting a recording; and stopping the supply of the light-on signal to the display section after the elapse of a predetermined time after the recording was started to thereby light off the display section, stopping the supply of the operation signal to the display section, and thereby returning to the camera recording standby state.

10 Claims, 6 Drawing Sheets

METHOD OF SHOOTING BY CAMERA INTEGRATED WITH VTR

BACKGROUND OF THE INVENTION

The present invention relates to a method of shooting by a VTR-integrated camera in which a VTR (Video Tape Recorder) section and a video camera section are integrally constituted and, more particularly, to a self timer method in a VTR-integrated camera which is suitable for use in the case of shooting a scene of a camera operator together in a picture.

Hitherto, a VTR-integrated camera in which a self timer is provided does not exist. As a self timer, for example, a self timer window is drawn in front of a still camera of the 35 mm lens shutter system in, e.g., "Shashin Kogyo Photographic Industries", published by Shashin Kogyo Syuppan Co., Ltd., November, 1986, page 74. It is also disclosed at page 80 of this report that "When a button is pressed, an LED display section is lit on for ten seconds and can be cancelled after the photographing was started".

In this still camera, a shutter is instantaneously opened and closed. On the other hand, in a VTR integrated camera, the shooting is generally performed for a certain period of time (e.g., 15, 30, 45, 60 seconds, etc.) or longer. Therefore, in the VTR-integrated camera, it is necessary to consider a time point to automatically stop the shooting by the camera after an elapse of a constant time after the start of the shooting by the camera or/and a time point to manually stop the photographing by the camera after an expiration of an arbitrary time. Moreover, if the state before the camera starts to shoot a scene and the state during the shooting by the camera can be visually distinguished, it is very convenient for both of a person who shoots by the camera and a person to be shoot.

SUMMARY OF THE INVENTION

It is an object of the present invention to provide a method of shooting by a VTR-integrated camera which is suitable for shooting by the camera.

One aspect according to the present invention comprises the steps of: setting a VTR section to a camera recording standby mode; supplying to a display section a repetitive signal for allowing the display section to be alternately repetitively lit on and off every first predetermined time by operating a self timer operating element; calculating a total time after the supply of the repetitive signal to the display section was started, when the total time has reached a second predetermined time longer than the first predetermined time, supplying the light-on signal to the display section to thereby light on the display section, supplying an operation signal to the VTR section, cancelling the camera recording standby state, and thereby starting the recording; and calculating a time after the recording was started, when this time has reached a third predetermined time longer than the first predetermined time, stopping the supply of the light-on signal to the display section to thereby light off the display section, stopping the supply of the operation signal to the VTR section, and returning the VTR section to the camera recording standby state.

By operating the self timer operating element, the display section is repetitively lit on and off. The display section is lit on when the shooting by the camera is started, and the display section is lit off when a predetermined time has passed after the start of the shooting, and the VTR section is returned to the camera recording standby state.

DESCRIPTION OF THE PREFERRED EMBODIMENT

An embodiment of the present invention will be described hereinbelow with reference to the drawings.

Figure 1:
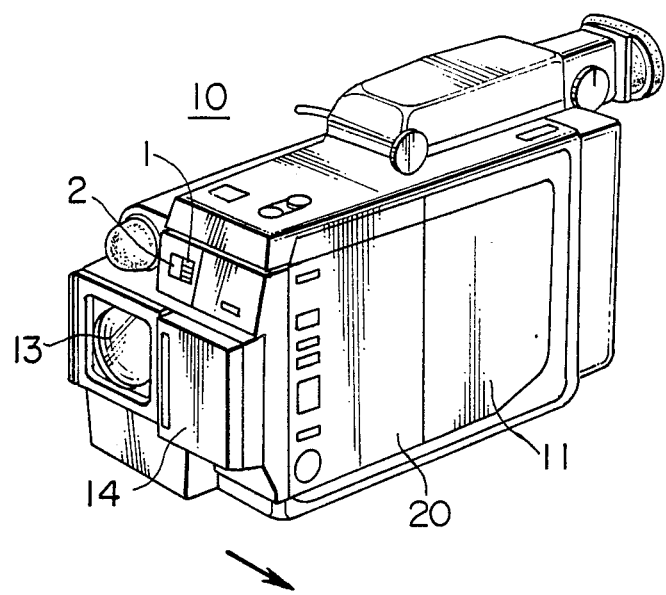
FIG. 1 is an external view of an embodiment of the present invention.
Figure 2:
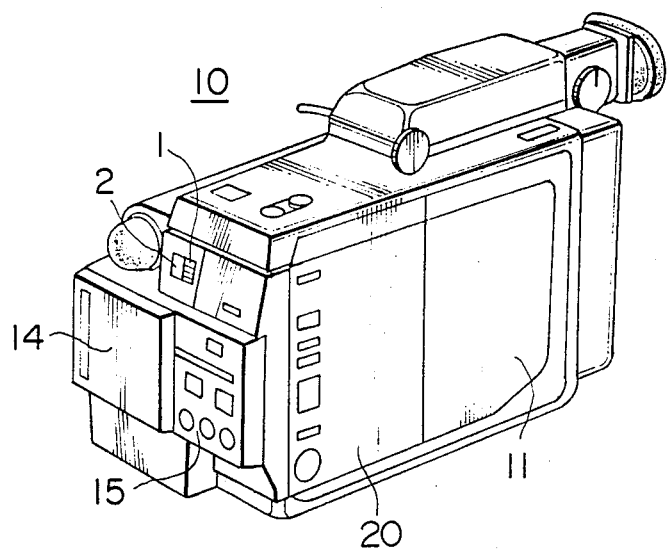
FIG. 2 is an external view when a slide cover in FIG. 1 was slid.
Figure 3:
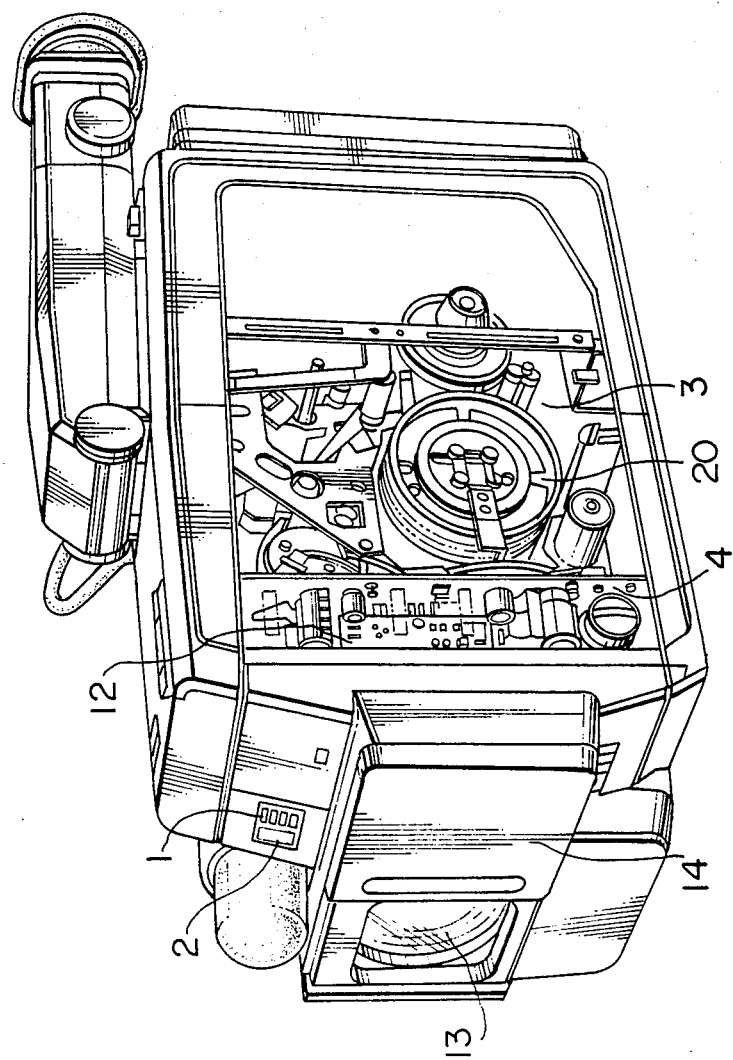
FIG. 3 is an enlarged perspective view showing an internal structure of the embodiment of the invention.

FIG. 1 is an external view of a VTR-integrated camera to which the invention is applied. This diagram illustrates a state in which a slide cover 14 is moved in the direction indicated by an arrow and a front surface of a camera unit 13 is open. FIG. 2 shows a state in which the slide cover 14 is moved and the front surface of the camera unit 13 is covered. As shown in FIG. 1, when the front surface of the camera unit 13 is open, the VTR-integrated camera is held in the recording standby state although not shown. The camera unit 13 arranged inside left portion of the VTR-integrated camera and the VTR unit 20 arranged inside right portion of VTR-integrated camera are disposed side by side laterally as shown in FIGS. 1 to 3. The recording standby state is substantially the same state as what is called a recording mode in which a tape is pulled out of a cassette set to the inside of a cassette cover 11 of a VTR-integrated camera 10 and wound around a rotary head cylinder by an amount of a predetermined wrap angle, and a pinch roller is moved to allow the tape to be come into pressure contact with a capstan. However, in this case, the recording standby state corresponds to a tape non-running state in which no rotation drive source is supplied to the capstan. In this state, although not shown, the shooting by the VTR-integrated camera 10 can be started by turning on a camera recording start button (not shown) arranged at a position in the rear surface of the VTR-integrated camera.

A method of setting into the recording standby state is not limited to the method whereby the slide cover 14 is moved as in this embodiment. The invention can also obviously use the following well-known method. Namely, (1) a lens cap is removed, (2) a power source button is depressed to supply a power, and (3) a mode change-over switch is set to the camera side, thereby setting into the camera recording standby state.

In FIGS. 1 and 2, a self timer button 1 and an LED display section 2 are arranged in the upper positions of the cover slide 14.

FIG. 3 is a diagram showing a state in which the inside of the VTR-integrated camera can be seen. In addition to the self timer button 1 and LED display section 2, a tape run mechanism section 3, a video circuit section 4, and a microprocessor 12 are shown.

Figure 4:
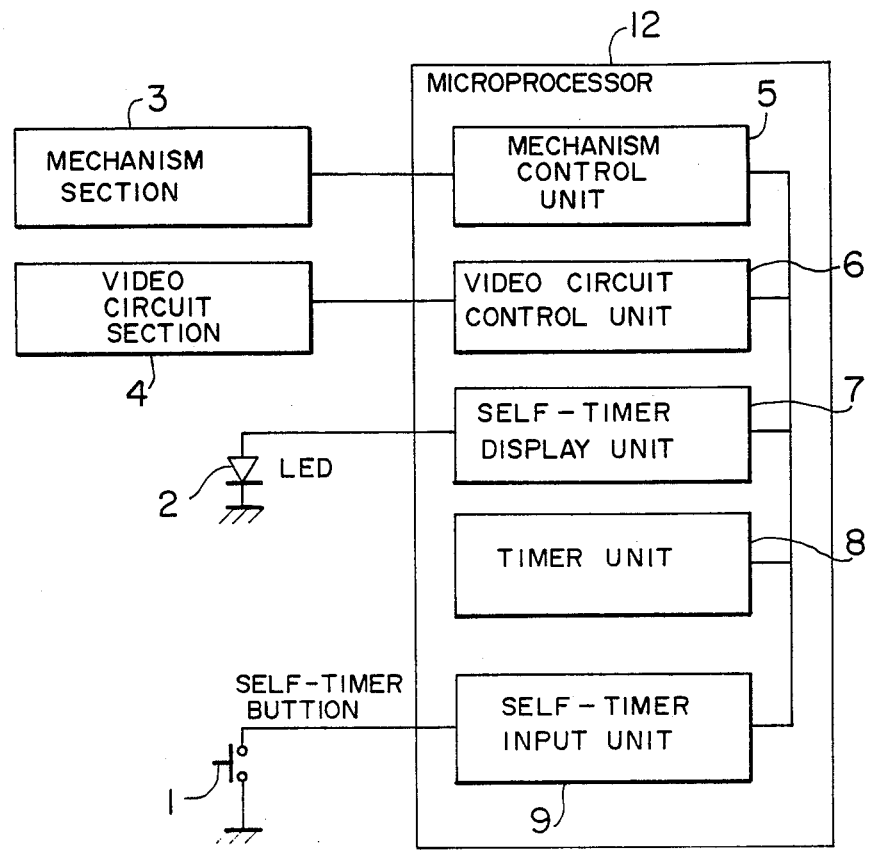
FIG. 4 is circuit constitutional diagram.

FIG. 4 is a circuit constitutional diagram. The microprocessor 12 comprises: mechanism control unit 5; video circuit control unit 6; self timer display unit 7; timer unit 8; and self timer button input unit 9. The tape running mechanism section 3 corresponds to the mechanism control unit 5. The video circuit section 4 corresponds to the video circuit control unit 6. The LED display section 2 corresponds to the self timer display unit 7. The self timer button 1 corresponds to the self timer button input unit 9.

In this embodiment, in accordance with a request of a camera operator, either one of two kinds of shooting methods can be selected by pressing the self timer button 1 once or twice. The shooting by the selected shooting method can be performed while confirming this method by looking at a change in light-on/off display state of the LED display section 2.

Figure 5:
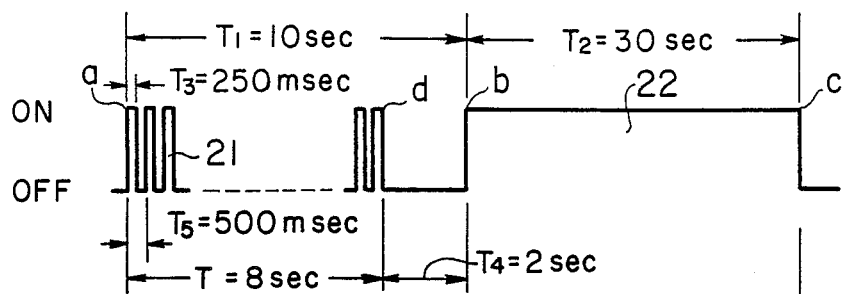
FIG. 5 is a waveform diagram for explaining the operation of a display section when a self timer button was once depressed.

The circuit constitutional diagram of FIG. 4 will now be described with reference to waveform diagrams for explaining the operations in FIGS. 5 to 8. An explanation will be first made by FIG. 5. FIG. 5 is an operation time chart in the case where in the VTR-integrated camera 10, the self timer button 1 was once depressed in the recording standby state. The LED display section 2 repetitively flickers (is lit on and off) for only a period of time $T_1$ (=10 seconds) after a self timer start point a by a repetitive pulse 21 which trails and rises every period of time $T_3$ (=250 msec). In this example, the generation of the repetitive pulses 21 is stopped at a time point d which is slightly before a recording start point b, namely, at a time point of $T_1$ (=8 sec). The LED display section 2 is lit off for a period of time $T_4$ (=2 sec), thereby predicting that start of the recording is approaching. Subsequently, the LED display section 2 starts to light on by a light-on signal 22 which is generated at the recording start point b. This light-on signal 22 is generated for only the period of time $T_2$ (=30 sec). The LED display section 2 finishes lighting-on at a self timer end point c.

Figure 6:
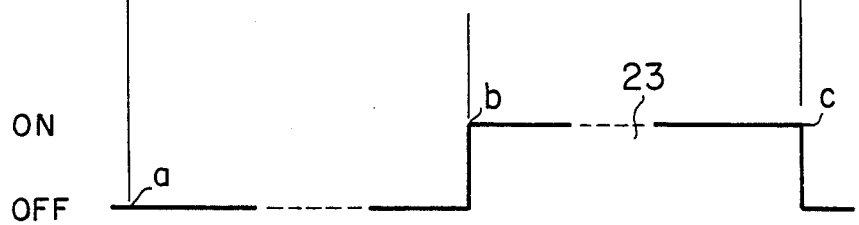
FIG. 6 corresponds to FIG. 5 and is a waveform diagram for explaining the operations of a mechanism section and a video circuit section.

An explanation will now be made by FIG. 6. FIG. 6 shows a waveform diagram for explaining the operations of the tape running mechanism section 3 and video circuit section 4. This diagram corresponds to the case where in the camera integrated with a VTR, the self timer button 1 was once depressed in the recording standby state. The recording standby state is held during the time interval from the self timer start point a to the recording start point b. An operation signal 23 is generated at the recording start point b, thereby setting the recording mode. The operation signal 23 is generated for the period of time $T_2$ (=30 sec). The VTR section is returned to the recording standby state at the self timer end point c.

Figure 7:
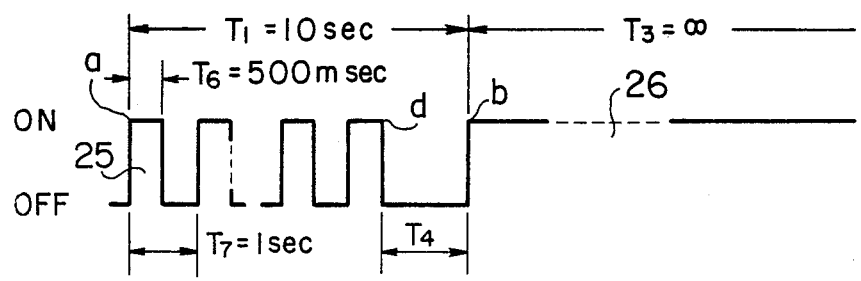
FIG. 7 is a waveform diagram for explaining the operation of the display section when the self timer button was depressed twice.
Figure 8:
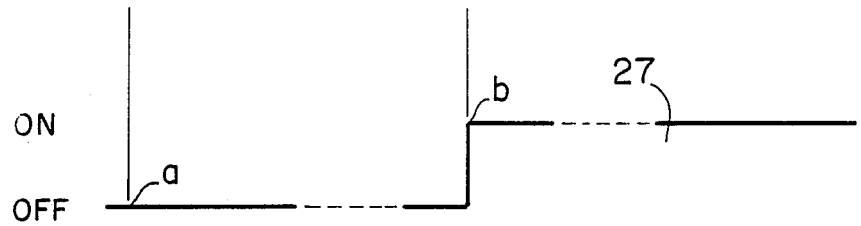
FIG. 8 corresponds to FIG. 7 and is a waveform diagram for explaining the operations of the mechanism section and video circuit section.

The operation when the self timer button 1 was depressed twice will now be described with reference to FIGS. 7 and 8. FIG. 7 shows a waveform diagram for explaining the operation of the LED display section 2. When the self timer button 1 was depressed twice in the recording standby state in the VTR-integrated camera 10, the LED display section 2 flickers for the recording standby period of time $T_1$ (=10 sec) from the self timer start point a by a repetitive pulse 25 which trails and rises every period of time $T_6$ (=500 msec). The generation of the repetitive pulse 25 is stopped at a time point d slightly before the recording start point b, i.e., at the period of time $T_1$ (=8 sec). The LED display section 2 is lit off for the period of time $T_4$ (=2 sec), thereby predicting that start of the recording is approaching. In the case of depressing the self timer button 1 once, the LED display section 2 flickers (is repetitively lit on and off) for the period of time $T_3$ (=250 msec). In the case of depressing the button 1 twice, the LED display section 2 flickers for the double period of time $T_6$ (=500 msec). In this manner, by changing the flickering period of time, the state in which the self timer button was depressed once and the state in which it was depressed twice can be distinguished. Subsequently, the LED display section 2 is lit on by a light-on signal 26 which is generated at the recording start point b. This light-on state is held. An explanation will now be made by FIG. 8. This diagram shows a waveform diagram for explaining the operations of the tape running mechanism section 3 and video circuit section 4. When the self timer button 1 was depressed twice in the recording standby state in the VTR-integrated camera 10, the recording standby state is held for the time interval from the self timer start point a to the recording start point b. The recording mode is set by an operation signal 27 which is generated at the recording start point b. To stop the recording in this case, it is sufficient to manually depress a camera recording start button in a manner similar to the conventional camera, so that the operating mode is returned from the recording mode to the recording standby state. If the self timer button 1 was erroneously depressed twice, it is sufficient to again depress this button. Due to this, the microprocessor 12 is made operative and initialized. Therefore, the camera is returned to the state in which the self timer button 1 is not depressed and the camera recording standby state is maintained.

Figure 9A:
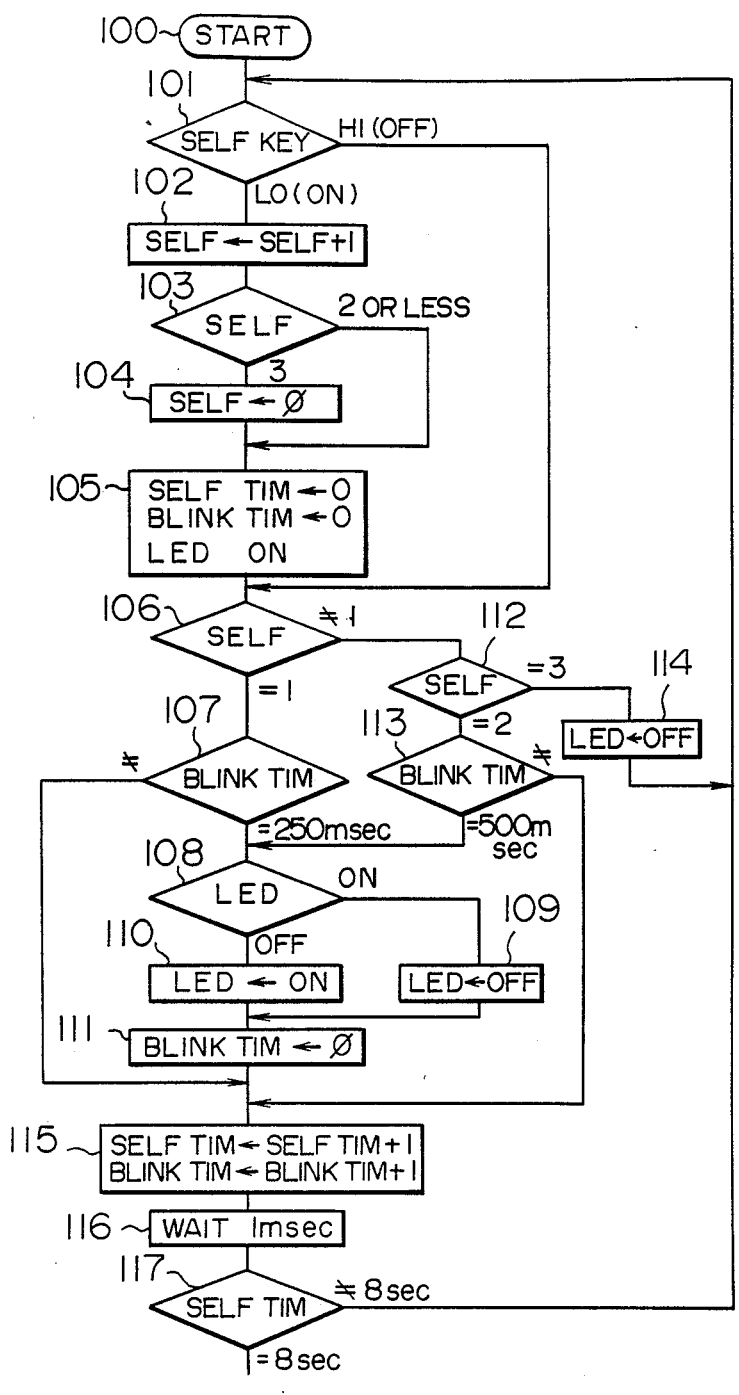
FIGS. 9A and 9B are flowcharts for explaining the operation in FIG. 4.
Figure 9B:
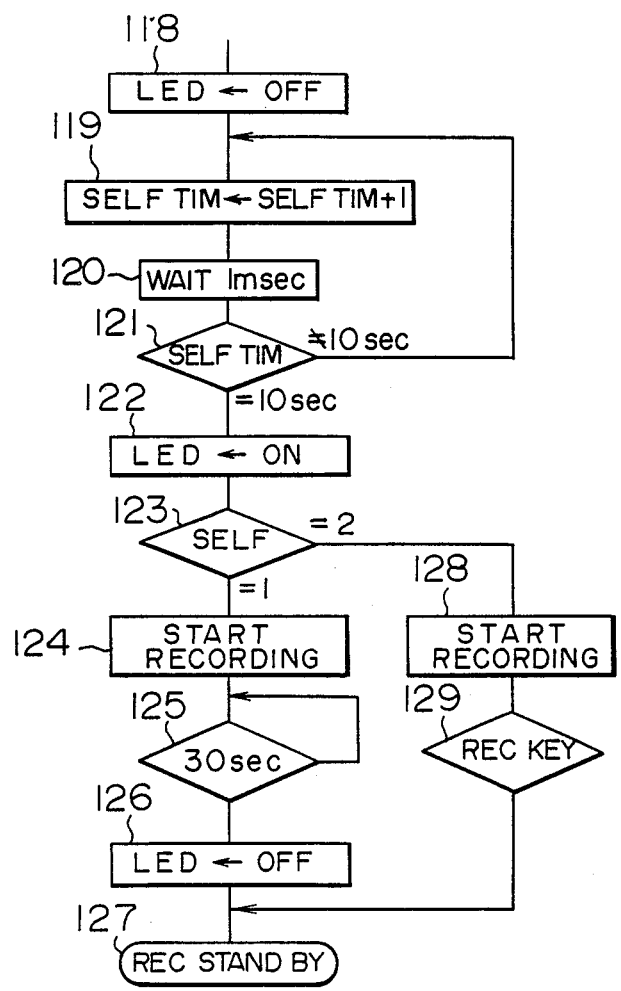

FIGS. 9A and 9B are flowcharts for the actual operation of the microprocessor 12 in FIG. 4. As a prerequisite, the recording standby state is set by moving the slide cover 14 in FIG. 2 as shown in FIG. 1 as mentioned above. This state corresponds to the start in step 100. In step 101, a check is made to see if the self timer button 1 in FIG. 1 and the like has been depressed or not. In step 102, the self timer is counted up by "1" when the self timer button 1 was depressed. In step 103, a check is made to see how many times the self timer button was depressed. If the self timer button was depressed twice or less, step 104 is skipped. If the self timer button was depressed three times, the self timer is reset in step 104. In step 105, the self timer and a blink timer are cleared and the LED display section is lit on. In step 106, a check is made to see if how many times the self timer button was depressed. If the self timer button was depressed once, a check is made in step 107 to see if the blink timer has reached 250 msec or not. In step 108, a check is made to see if the LED display section is ON (lighting) or OFF (lit-off) when the blink timer has reached 250 msec. When the LED display section 2 is ON, it is lit off in step 109. When the LED display section is OFF, it is lit on in step 110. In step 111, the blink timer is cleared. Therefore, the LED display section is repetitively turned ON and OFF, namely, is repetitively lit on and off every 250 msec. In step 112, a check is made to see if the self timer button has been depressed twice or not. If the self timer button was depressed twice, a check is made in step 113 to see if the blink timer has reached 500 msec or not. Therefore, in the case of the second depression, the LED display section is repetitively turned ON and OFF, i.e., is repetitively lit on and off every 500 msec. In the case of the third depression of the self timer button, the LED display section is lit off in step 114. In step 115, the self timer is counted up to count the total time after the self timer button was depressed, and the blink timer is counted up to count 250 msec. In step 116, the operation waits for 1 msec. In step 117, a check is made to see if eight seconds have elapsed or not after the self timer button was depressed. In step 118, the LED display section is lit off when 8 sec has passed. In step 119, the self timer is counted up to calculate the total time of ten minutes after the depression of the self timer button. In step 120, the operation waits for 1 msec. In step 121, a check is made to see if total ten minutes have passed or not after the depression of the self timer button. In step 122, the LED display section is switched to the ON state (is lit on) when ten minutes have passed. In step 123, a check is made to see if the self timer button was depressed once or not. In step 124, the recording is started in the case of the first depression of the self timer button. In step 125, a check is made to see if thirty seconds have passed or not after the recording was started. If 30 seconds have elapsed, the LED display section is turned OFF (is lit off) in step 126. In step 127, the camera is returned to the recording standby state. In step 128, the recording is started when the self timer button was depressed twice. In step 129, a check is made to see if the recording start button has been manually depressed or not. If it was manually depressed, the camera is returned to the recording standby state in step 127.

According to the present invention, even a operator which could not appear in a picture because he had to photograph by operating the camera integrated with a VTR hitherto can together appear in the same video image. When considering the case where a camera operator is also shooted with the scene in the conventional method, the shooting operation of the camera is first started and a blank certainly exists during the operator is leaving the camera. After this blank interval, the operator appears in the screen and after an elapse of a predetermined shooting period of time, another blank exists until the operator is returned to the camera to stop it again. Consequently, it takes a long time to obtain a series of video images.

On the other hand, even if two persons want to together shooting and record in a travel or the like, there is a case where a good timing of a recording chance is unfortunately frequently lost because it is hard to request for an unknown passerby to operate the VTR-integrated camera as in a still camera of the 35 mm lens shutter system. According to the self timer of the invention, the above inconveniences can be all solved and use of the video tape recorder may be extended.

We claim:

1. A method of photographing by a VTR-integrated camera in which a VTR section with a recording function and a video camera section are integrally constituted, comprising the steps of:
   setting said VTR section to a camera recording standby state;
   supplying to a display section a repetitive signal for allowing said display section to be alternately repetitively lit on and off every first predetermined time by operating a self timer operating element;
   calculating a total time after the supply of said repetitive signal to the display section was started, when said total time has reached a second predetermined time longer than said first predetermined time, supplying a light-on signal to the display section to thereby light on the display section, supplying an operation signal to said VTR section, cancelling said camera recording standby state, and thereby starting a recording; and
   calculating a time after the recording was started, when said time has reached a third predetermined time longer than said first predetermined time, stopping the supply of said light-on signal to the display section to thereby light off the display section, stopping the supply of said operation signal to said VTR section, and thereby returning to said camera recording standby state.

2. A method according to claim 1, further including a step of stopping the supply of said light-on signal to thereby light off the display section when a time has reached a fourth predetermined time slightly before said second predetermined time.

3. A method according to claim 1, wherein said second predetermined time is ten seconds and said third predetermined time is a time which is equal to (fifteen seconds x a positive integer).

4. A method according to claim 1, wherein said first predetermined time is 250 msec, said second predetermined time is ten seconds, and said third predetermined time is thirty seconds.

5. A method according to claim 2, wherein said fourth predetermined time is two seconds.

6. A method of photographing by a camera integrated with a VTR in which a VTR section with a recording function and a video camera section are integrally constituted, comprising the steps of:
   setting said VTR section to a camera recording standby state;
   supplying to a display section a repetitive signal for allowing said display section to be alternately repetitively lit on and off every first predetermined time by operating a self timer operating element;
   calculating a total time after the supply of said repetitive signal to said display section was started, when said total time has reached a second predetermined time longer than said first predetermined time, supplying a light-on signal to said display section to thereby light on the display section, supplying an operation signal to said VTR section, cancelling said camera recording standby state, and thereby starting a recording; and
   manually stopping the supply of said light-on signal to said display section to thereby light off the display section, stopping the supply of said operation signal to the VTR section, and returning to the camera recording standby state.

7. A method according to claim 6, further including a step of stopping the supply of said light-on signal and lighting off said display section when a time has reached a fourth predetermined time slightly before said second predetermined time.

8. A method according to claim 6, wherein said first predetermined time is 500 msec and said second predetermined time is ten seconds.

9. A method of photographing in a camera integrated with a VTR in which a VTR section with a recording function and a video camera section are integrally constituted, whereby an operation is shifted from a camera recording standby state to another step in accordance with whether a self timer operating element is operated once or twice, wherein
when said self timer operating element was operated once, said method comprises the steps of:
supplying to a display section a first repetitive signal for allowing said display section to be alternately repetitively lit on and off every first predetermined time;
calculating a total time after the supply of said first repetitive signal to said display section was started, when said total time has reached a second predetermined time longer than said first predetermined time, supplying a light-on signal to the display section to thereby light on the display section, supplying an operation signal to said VTR section, cancelling said camera recording standby state, and thereby starting a recording; and
calculating a time after the recording was started, when said time has reached a third predetermined time longer than said second predetermined time, stopping the supply of said light-on signal to said display section to thereby light off the display section, stopping the supply of said operation signal to said VTR section, and thereby returning to the camera recording standby state,
and when the self timer operating element was operated twice, said method comprises the steps of:
supplying to said display section a second repetitive signal for allowing the display section to be alternately repetitively lit on and off every fourth predetermined time different from said first predetermined time; and
calculating a total time after said second repetitive signal was supplied to the display section, when said total time has reached said second predetermined time, supplying the light-on signal to the display section to thereby light on the display section, cancelling the camera recording standby state, and thereby starting the recording.

10. A method according to claim 9, wherein said first predetermined time is 250 msec, said second predetermined time is 10 seconds, said third predetermined time is 30 seconds, and said fourth predetermined time is 500 msec.

* * * * *